(12) United States Patent
Crouse et al.

(10) Patent No.: US 12,511,486 B2
(45) Date of Patent: Dec. 30, 2025

(54) BOTTOM-UP NEURAL SEMANTIC PARSER

(71) Applicant: International Business Machines Corporation, Armonk, NY (US)

(72) Inventors: Maxwell Crouse, Chicago, IL (US); Pavan Kapanipathi Bangalore, White Plains, NY (US); Achille Belly Fokoue-Nkoutche, White Plains, NY (US); Tamir Klinger, Brooklyn, NY (US); Subhajit Chaudhury, White Plains, NY (US); Ramon Fernandez Astudillo, White Plains, NY (US); Tahira Naseem, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 18/218,211

(22) Filed: Jul. 5, 2023

(65) Prior Publication Data

US 2025/0013829 A1    Jan. 9, 2025

(51) Int. Cl.
  *G06F 40/30*   (2020.01)
  *G06F 40/205*  (2020.01)
  *G06F 40/40*   (2020.01)

(52) U.S. Cl.
  CPC ........... *G06F 40/30* (2020.01); *G06F 40/205* (2020.01); *G06F 40/40* (2020.01)

(58) Field of Classification Search
  CPC ........... G06F 11/3409; G06F 16/2433; G06F 16/3334; G06F 40/205; G06F 40/211;
  (Continued)

(56) References Cited

U.S. PATENT DOCUMENTS 8,131,655 B1 *  3/2012  Cosoi ................. G06N 3/045
                                              706/12
10,078,634 B2   9/2018  Gou et al.
                (Continued)

FOREIGN PATENT DOCUMENTS

CN      105760462 B    3/2018
CN      110765235 A    2/2020
                (Continued)

OTHER PUBLICATIONS

Herzig, J., et al., "Span-based semantic parsing for compositional generalization" arXiv:2009.06040v2, Jun. 13, 2021, 14 pages.
(Continued)

*Primary Examiner* — Gerald Gauthier
(74) *Attorney, Agent, or Firm* — Scully, Scott, Murphy & Presser, P.C.; Steven Bouknight

(57) ABSTRACT

A decoder of a neural semantic parser receives input data associated with a natural language expression. An action is selected from a queue of actions, the queue of actions storing at least one action, the action being associated with an element from vocabulary of the natural language expression. The selected action is processed to build a tree structure where the processing of the selected action expands the tree structure with a node representing the element, where the tree structure is expanded bottom-up. A set of new actions is generated based on the node associated with the selected action and the vocabulary. The set of new actions is added to the queue of actions. The decoder repeats selecting, processing, generating and adding until a criterion is met. A logical form of the natural language expression is output based on the tree structure.

20 Claims, 11 Drawing Sheets

(58) Field of Classification Search
CPC .... G06F 40/216; G06F 40/253; G06F 40/268; G06F 40/295; G06F 40/30; G06F 40/40; G06F 3/0481; G06F 8/75; G06F 21/577; G06F 40/279; G06F 40/289; G06N 3/045; G06N 5/022; G06N 5/042; G06N 20/00; G06N 3/04; G06N 3/044; G06N 3/10; G06N 5/01; G10L 15/16; G10L 15/183; H04L 67/535

See application file for complete search history.

(56) References Cited

U.S. PATENT DOCUMENTS

| | | | | |
|---|---|---|---|---|
| 10,298,700 | B2* | 5/2019 | Borden | H04L 67/535 |
| 11,429,876 | B2 | 8/2022 | Bangalore et al. | |
| 11,966,704 | B1* | 4/2024 | Magary | G06F 40/30 |
| 11,977,836 | B1* | 5/2024 | Archambeau | G06F 40/279 |
| 12,165,032 | B2* | 12/2024 | Li | G06N 3/10 |
| 2010/0161316 | A1* | 6/2010 | Haug | G06F 40/216 704/9 |
| 2011/0301942 | A1* | 12/2011 | Collobert | G06F 40/289 704/E11.001 |
| 2014/0249804 | A1* | 9/2014 | Jackson | G06F 40/253 704/9 |
| 2015/0106079 | A1* | 4/2015 | Bostick | G06F 16/3334 704/9 |
| 2015/0154173 | A1* | 6/2015 | Kim | G06F 40/268 704/9 |
| 2015/0261744 | A1* | 9/2015 | Suenbuel | G06F 40/211 704/9 |
| 2015/0356073 | A1* | 12/2015 | Vion-Drury | G06N 5/042 704/9 |
| 2018/0052817 | A1* | 2/2018 | Bethard | G06F 40/30 |
| 2019/0066660 | A1* | 2/2019 | Liang | G10L 15/183 |
| 2020/0104366 | A1* | 4/2020 | Xu | G06N 5/022 |
| 2021/0019370 | A1* | 1/2021 | Andrassy | G06N 3/044 |
| 2021/0209163 | A1* | 7/2021 | Boxwell | G06F 40/30 |
| 2022/0043981 | A1* | 2/2022 | Liang | G06N 3/045 |
| 2022/0129450 | A1* | 4/2022 | Cao | G06F 16/2433 |
| 2022/0171932 | A1* | 6/2022 | Parthasarathy | G06N 20/20 |
| 2022/0188524 | A1* | 6/2022 | Pfitzmann | G06N 5/01 |
| 2022/0343903 | A1* | 10/2022 | Mostafazadeh | G10L 15/16 |
| 2023/0060589 | A1 | 3/2023 | Ravishankar et al. | |
| 2023/0111052 | A1* | 4/2023 | Ray | G06N 5/022 704/9 |
| 2023/0138152 | A1* | 5/2023 | Jung | G06N 3/04 706/25 |
| 2023/0305822 | A1* | 9/2023 | Ferrucci | G06N 20/00 |
| 2023/0306022 | A1* | 9/2023 | Popescu | G06F 40/30 |
| 2023/0342383 | A1* | 10/2023 | Xia | G06F 16/3344 |
| 2024/0036837 | A1* | 2/2024 | Tamilselvam | G06F 8/75 |
| 2024/0176805 | A1* | 5/2024 | Liu | G06F 40/295 |
| 2024/0394251 | A1* | 11/2024 | Brende | G06F 11/3409 |
| 2024/0427575 | A1* | 12/2024 | Rajkumar Kannan | G06F 21/577 |
| 2024/0427997 | A1* | 12/2024 | Salama | G06F 40/40 |
| 2025/0013829 | A1* | 1/2025 | Crouse | G06F 40/211 |

FOREIGN PATENT DOCUMENTS

| | | |
|---|---|---|
| CN | 110942769 A | 3/2020 |
| CN | 111898386 A | 11/2020 |
| CN | 115906868 A | 4/2023 |

OTHER PUBLICATIONS

Odena, A., et al., "Bustle: Bottom-Up program synthesis through learning-guided exploration", arXiv:2007.14381v3, Sep. 30, 2021, 16 pages.

Rubin, O., et al., "SmBoP: Semi-autoregressive bottom-up semantic parsing", arXiv:2010.12412v2, Apr. 11, 2021, 14 pages.

Andreas, J., et al., "Good-enough compositional data augmentation", arXiv:1904.09545v4, May 19, 2020, 11 pages.

Bergen, L., et al., "Systematic generalization with edge transformers", 35th Conference on Neural Information Processing Systems (NeurIPS 2021), iv:2112.00578v1, Dec. 1, 2021, 15 pages.

Crouse, M., "Question-Answering with Structural Analogy", Ph.D. Thesis, Northwestern University, 2021, 107 pages.

Dong, L., et al., "Language to Logical Form with Neural Attention", arXiv: 1601.01280v2, Jun. 6, 2016, 11 pages.

Dong, L., et al., "Coarse-to-Fine Decoding for Neural Semantic Parsing", Proceedings of the 56th Annual Meeting of the Association for Computational Linguistics, Jul. 15-20, 2018, pp. 731-742.

Drozdov, A., et al., "Compositional semantic parsing with large language models", arXiv:2209.15003v2, Sep. 30, 2022, 59 pages.

Finegan-Dollack, C., et al., "Improving text-to-sql evaluation methodology", arXiv:1806.09029v1, Jun. 23, 2018, 10 pages.

Furrer, D., et al., "Compositional Generalization in Semantic Parsing: Pre-training vs. Specialized Architectures", arXiv:2007.08970v3, Sep. 22, 2021, 16 pages.

Gai, Y., et al., "Grounded Graph Decoding Improves Compositional Generalization in Question Answering", arXiv:2111.03642v1, Nov. 5, 2021, 10 pages.

Guo, Y., et al., "Hierarchical Poset Decoding for Compositional Generalization in Language", 34th Conference on Neural Information Processing Systems (NeurIPS 2020), arXiv:2010.07792v1, Oct. 15, 2020, 12 pages.

Herzig, J., et al., "Span-based Semantic Parsing for Compositional Generalization", Proceedings of the 59th Annual Meeting of the Association for Computational Linguistics and the 11th International Joint Conference on Natural Language Processing, Aug. 1-6, 2021, pp. 908-921.

Herzig, J., et al., "Unlocking Compositional Generalization in Pre-trained Models Using Intermediate Representations", arXiv:2104.07478v1, Apr. 15, 2021, 13 pages.

Jambor, D., et al., "LAGr: Label Aligned Graphs for Better Systematic Generalization in Semantic Parsing", arXiv:2110.07572v2, Jun. 1, 2022, 14 pages.

Jia, R., et al., "Data Recombination for Neural Semantic Parsing", injectarXiv:1606.03622v1, Jun. 11, 2016, 11 pages.

Keysers, D., et al., "Measuring compositional generalization: A comprehensive method on realistic data", arXiv: 1912.09713v2, Jun. 25, 2020, 38 pages.

Kwiatkowski, T., et al., "Lexical Generalization in CCG Grammar Induction for Semantic Parsing", Proceedings of the 2011 Conference on Empirical Methods in Natural Language Processing, Jul. 27-31, 2011, pp. 1512-1523.

Li, S., et al., "Graph-to-Tree Neural Networks for Learning Structured Input-Output Translation with Applications to Semantic Parsing and MathWord Problem", Findings of the Association for Computational Linguistics: EMNLP 2020, Nov. 16-20, 2020, pp. 2841-2852.

Liang, P., et al., "Learning Dependency-Based Compositional Semantics", Proceedings of the 49th Annual Meeting of the Association for Computational Linguistics, Jun. 19-24, 2011, pp. 590-599.

Liu, C., et al., "Learning Algebraic Recombination for Compositional Generalization", arXiv:2107.06516v1, Jul. 14, 2021, 18 pages.

Wong, Y.W., et al., "Learning Synchronous Grammars for Semantic", Proceedings of the 45th Annual Meeting of the Association of Computational Linguistics, Jun. 2007, pp. 960-967.

Xu, K., et al., "Graph2seq: Graph to sequence learning with attention-based neural networks", arXiv:1804.00823v4, Dec. 3, 2018, 18 pages.

Zettlemoyer, L.S., et al., "Online Learning of Relaxed CCG Grammars for Parsing to Logical Form", Proceedings of the 2007 Joint Conference on Empirical Methods in Natural Language Processing and Computational Natural Language Learning, Jun. 2007, pp. 678-687.

Zhao, K., et al., "Type-Driven Incremental Semantic Parsing with Polymorphism", Human Language Technologies: The 2015 Annual Conference of the North American Chapter of the ACL, May 31-Jun. 5, 2015, pp. 1416-1421.

Zheng, H., et al., "Compositional Generalization via Semantic Tagging", Findings of the Association for Computational Linguistics: EMNLP 2021, Nov. 7-11, 2021, pp. 1022-1032.

(56) References Cited

OTHER PUBLICATIONS

Crouse, M., et al., "Laziness Is a Virtue When It Comes to Compositionality in Neural Semantic Parsing", arXiv:2305.04346v1 [cs.CL], May 7, 2023, 13 pages (Grace Period Disclosure).
Alvarez-Melis, et al., Tree-Structured Decoding With Doubly-Recurrent Neural Networks, ICLR, Feb. 6, 2017, 17 pages.
Carpenter B., Type-Logical Semantics, Language, Speech, and Communication, 1997, pp. 445-446.
Dahl, et al., Expanding the Scope of the ATIS Task: the ATIS-3 Corpus, HLT '94: Proceedings of the workshop on Human Language Technology, Mar. 8-11, 1994, pp. 43-48.
Dong, et al., Language to Logical Form with Neural Attention, Proceedings of the 54th Annual Meeting of the Association for Computational Linguistics, Aug. 7-12, 2016, pp. 33-43.
Higgins, et al., Scan: Learning Hierarchical Compositional Visual Concepts, arXiv: 1707.03389v3 [stat. ML], Jun. 6, 2018, 24 pages.
Hochreiter, et al., Long Short-Term Memory, Neural Computation, 1997, vol. 9, Issue 8, pp. 1735-1780.
Iyer, et al., Learning a Neural Semantic Parser from User Feedback, Proceedings of the 55th Annual Meeting of the Association for Computational Linguistics, Jul. 30-Aug. 4, 2017, pp. 963-973.
Kim, et al. ,Cogs: A Compositional Generalization Challenge Based on Semantic Interpretation, arXiv:2010.05465v1 [cs.CL], Oct. 12, 2020, 19 pages.
Krishnamurthy, et al., Neural Semantic Parsing with Type Constraints for Semi-Structured Tables, Proceedings of the 2017 Conference on Empirical Methods in Natural Language Processing, Sep. 7-11, 2017, pp. 1516-1526.
Lake, et al., Building Machines That Learn and Think Like People, arXiv:1604.00289v3 [cs.AI], Nov. 2, 2016, 58 pages.
Lake, et al., Generalization Without Systematicity: On the Compositional Skills of Sequence-To-Sequence Recurrent Networks, arXiv: 1711.00350v3 [cs.CL], Jun. 9, 2018, 12 pages.
Mccarthy, et al., Recursive Functions of Symbolic Expressions and Their Computation By Machine, Part I, Communications of the ACM, Apr. 1, 1960, vol. 3, Issue 4, pp. 184-195.
Mccarthy, J., History of LISP, History of programming languages, Jun. 1, 1978, pp. 173-185.
Montague, R., The Proper Treatment of Quantification in Ordinary English, Springer, 1973, pp. 17-34.
Oren, et al., Improving Compositional Generalization in Semantic Parsing, Findings of the Association for Computational Linguistics: EMNLP 2020, Nov. 16-20, 2020, pp. 2482-2495.
Raffel, et al., Exploring the Limits of Transfer Learning with a Unified Text-to-Text Transformer, arXiv:1910.10683v4 [cs.LG], Sep. 19, 2023, 67 pages.
Shaw, et al., Compositional Generalization and Natural Language Variation: Can a Semantic Parsing Approach Handle Both?, arXiv:2010.12725v2 [cs.CL], Jun. 1, 2021, 17 pages.
Shaw, et al., Self-Attention with Relative Position Representations, Proceedings of NAACL-HLT 2018, Jun. 1-6, 2018, pp. 464-468.
Vaswani et al., Attention is All you Need, arXiv: 1706.03762v7 [cs.CL], Aug. 2, 2023, 15 pages.
Xiao, et al., Sequence-based Structured Prediction for Semantic Parsing, Proceedings of the 54th Annual Meeting of the Association for Computational Linguistics, Aug. 7-12, 2016, pp. 1341-1350.
Zelle, et al., Learning to Parse Database Queries Using Inductive Logic Programming, In Proceedings of the National Conference on Artificial Intelligence, Aug. 1996, pp. 1050-1055.
Zhang, et al., Spider: A Large-Scale Human-Labeled Dataset for Complex and Cross-Domain Semantic Parsing and Text-to-SQL Task, In EMNLP, Oct.-Nov. 2018, pp. 3911-3921.
Zhou, et al., AMR Parsing with Action-Pointer Transformer, arXiv:2104.14674v3 [cs.CL] May 18, 2021, 14 pages.
Zhou, et al., Structure-aware Fine-tuning of Sequence-to-sequence Transformers for Transition-based AMR Parsing, arXiv:2110.15534v1 [cs.CL] Oct. 29, 2021, 12 pages.

\* cited by examiner

BOTTOM-UP NEURAL SEMANTIC PARSER

STATEMENT REGARDING PRIOR DISCLOSURES BY THE INVENTOR OR A JOINT INVENTOR

The following disclosure is submitted under 35 U.S.C. 102(b)(1)(A): DISCLOSURE: Laziness Is a Virtue When It Comes to Compositionality in Neural Semantic Parsing, Maxwell Crouse, Pavan Kapanipathi, Subhajit Chaudhury, Tahira Naseem, Ramon Astudillo, Achille Fokoue, Tim Klinger, 7 May 2023, arXiv:2305.04346v1 [cs.CL], 13 pages.

BACKGROUND

The present application relates generally to computers and computer applications, and more particularly to machine learning, natural language processing, and neural semantic parsers.

BRIEF SUMMARY

The summary of the disclosure is given to aid understanding of a computer system and method of neural semantic parsing, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in some embodiments, includes receiving input data associated with a natural language expression. The method also includes selecting an action from a queue of actions, e.g., by a decoder of a neural semantic parser, the queue of actions storing at least one action, the action being associated with an element from vocabulary of the natural language expression. The method also includes processing the selected action to build a tree structure, e.g., by the decoder, where the processing of the selected action expands the tree structure with a node representing the element, where the tree structure is expanded bottom-up. The method also includes generating, e.g., by the decoder, a set of new actions based on the node associated with the selected action and the vocabulary. The method also includes adding, e.g., by the decoder, the set of new actions to the queue of actions. The method also includes repeating, e.g., by the decoder, the selecting, processing, generating and adding until a criterion is met. The method also includes outputting, e.g., by a decoder of a neural semantic parser, a logical form of the natural language expression, the logical form being a machine interpretable meaning representation of the input data, where the logical form is provided as an s-expression representing the tree structure, where symbols of the s-expression represent nodes of the tree structure.

A system, in some embodiments, includes at least one computer processor. The system also includes at least one memory device coupled with the at least one computer processor. At least one computer processor is configured to receive input data associated with a natural language expression. At least one computer processor is also configured to select an action from a queue of actions the queue of actions storing at least one action, the action being associated with an element from vocabulary of the natural language expression. At least one computer processor is also configured to process the selected action to build a tree structure where the processing of the selected action expands the tree structure with a node representing the element, where the tree structure is expanded bottom-up. At least one computer processor is also configured to generate a set of new actions based on the node associated with the selected action and the vocabulary. At least one computer processor is also configured to add the set of new actions to the queue of actions. At least one computer processor is also configured to repeat selecting, processing, generating and adding until a criterion is met. At least one computer processor is also configured to output a logical form of the natural language expression, the logical form being a machine interpretable meaning representation of the input data, where the logical form is provided as an s-expression representing the tree structure, where symbols of the s-expression represent nodes of the tree structure.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
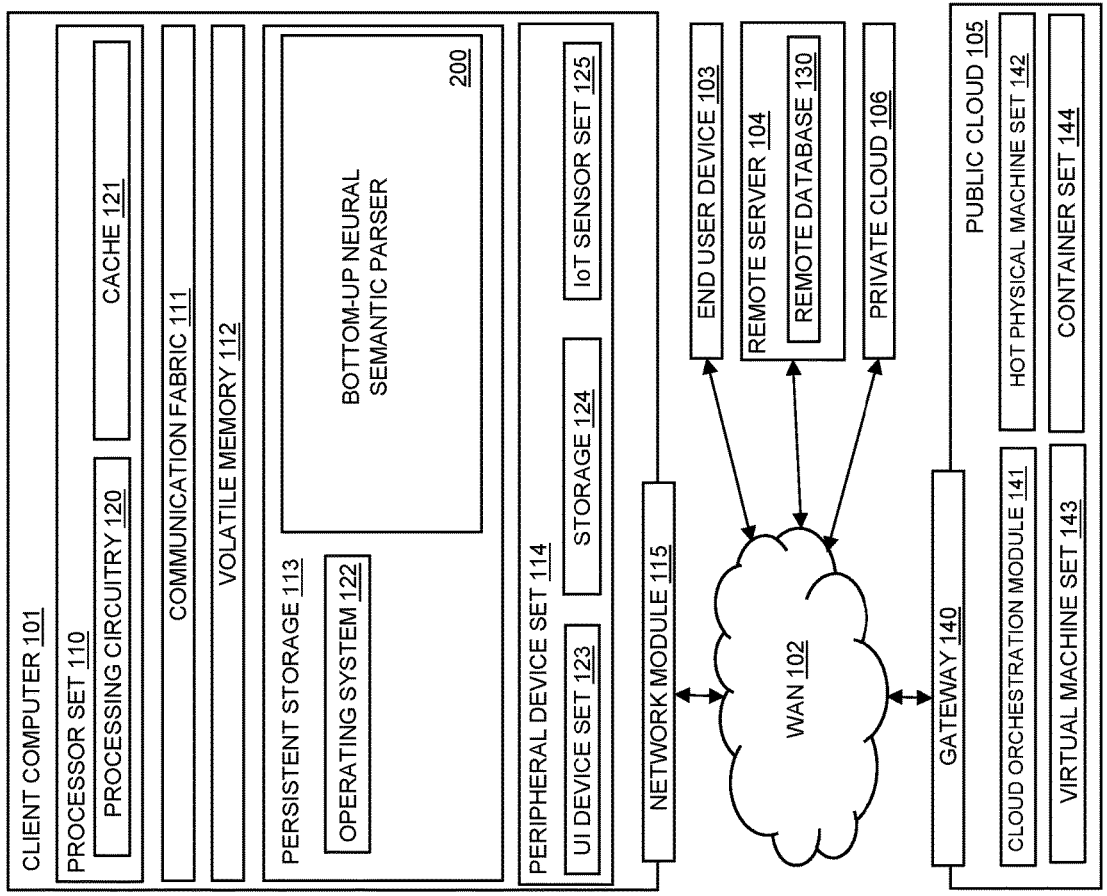
FIG. 1 shows an example of a computing environment, which can implement bottom-up neural semantic parser in an embodiment.

In some embodiments, a computer-implemented method includes receiving input data associated with a natural language expression. The method also includes selecting an action from a queue of actions, e.g., by a decoder of a neural semantic parser, the queue of actions storing at least one action, the action being associated with an element from vocabulary of the natural language expression. The method also includes processing the selected action to build a tree structure, e.g., by the decoder, where the processing of the selected action expands the tree structure with a node representing the element, where the tree structure is expanded bottom-up. The method also includes generating, e.g., by the decoder, a set of new actions based on the node associated with the selected action and the vocabulary. The method also includes adding, e.g., by the decoder, the set of new actions to the queue of actions. The method also includes repeating, e.g., by the decoder, the selecting, processing, generating and adding until a criterion is met. The method also includes outputting, e.g., by a decoder of a neural semantic parser, a logical form of the natural language expression, the logical form being a machine interpretable meaning representation of the input data, where the logical form is provided as an s-expression representing the tree structure, where symbols of the s-expression represent nodes of the tree structure.

A bottom-up approach that builds a tree graph structure upwards by combining entities and subexpressions together to form larger subexpressions, e.g., generating logical forms by conditioning on relevant subexpressions can improve compositional generalizability.

One or more of the following features are separable or optional from each other. In some embodiments, the tree structure is a directed acyclic graph (DAG). The use of DAGs allows the method to not repeatedly decode the same subtrees, thereby improving computer processing efficiency.

In some embodiments, the action is selected based on the action meeting a threshold probability that the element is to be used in expanding the tree structure. Conditioning selection of actions based on a threshold probability allows the method to select relevant expressions.

In some embodiments, the action is selected that has highest probability that the element is to be used in expanding the tree structure. Conditioning selection based on the highest probability allows the method to select an action having most relevancy among candidate actions.

In some embodiments, the generating a set of new actions based on the node associated with the selected action and the vocabulary further includes, determining a probability that the tree structure should contain a new node representing an element of the vocabulary that has the node as an argument. In this way, the tree structure can be built upwards based on existing node being identified as being an argument to a potential new node.

In some embodiments, the generating a set of new actions based on the node associated with the selected action and the vocabulary further includes, determining a probability that the tree structure should contain a new node representing an element of the vocabulary that has a pair of nodes in the tree structure as a left argument and a right argument. In this way, the tree structure can be built upwards based on existing nodes being identified as being arguments to a potential new node.

In some embodiments, the action includes a generation action that makes the node a parent to an existing single node in the tree structure. In this way, for example, a node is created upwards that has an edge to an existing node.

In some embodiments, the action includes a pointer action that makes the node a parent to an existing pair of sibling nodes in the tree structure. In this way, for example, a node is created upwards that has edges to existing nodes.

A system including at least one computer processor and at least one memory device coupled with the at least one computer processor is provided, where the at least one computer processor is configured to perform one or more methods described herein. A computer program product that includes a computer readable storage medium having program instructions embodied therewith, the program instructions readable by a device to cause the device to perform one or more methods described herein is also be provided.

Semantic parsing, given a natural language utterance, produces a semantic representation of that utterance. Neural semantic parsers can be built based on a neural network architecture, e.g., a transformer architecture such as T5 (Text-to-Text Transfer Transformers), which uses text-to-text approach. Neural semantic parsers can be trained to generate a target text given an input. Many neural semantic parsers are also built as an autoregressive language model, a type of machine learning model that uses autoregressive techniques to predict the next word in a sequence of words based on the words that preceded it. Semantic parsers can be used in natural language processing and machine translation.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as bottom-up neural semantic parser code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Systems, methods and techniques that can provide a bottom-up neural semantic parser in various embodiments are disclosed. A neural semantic parsing generation method in an embodiment can construct logical forms from the bottom up, beginning from the logical form's leaves. In an embodiment, the method can incrementally build up a set of potential semantic parses, only expands and processes the most promising candidate parses at each generation step. Such a relatively parsimonious expansion scheme allows a system implementing the method to maintain an arbitrarily large set of parse hypotheses that need not be realized and thus incur minimal computational overhead. For instance, savings in memory space and processing power, as well as efficiently performing language model or neural semantic parser can be realized. Semantic parsing described herein can be applicable to models of neural network architecture, and is also referred to as neural semantic parser. The terms neural semantic parser and semantic parser can be used interchangeably, e.g., for brevity.

In an aspect, a bottom-up decoding technique disclosed herein can be used for semantic parsing, which generates machine interpretable meaning representation (e.g., logical form) of a natural language expression. In an aspect, the bottom-up decoding scheme can semi-autoregressively construct logical forms in a way that facilitates compositional generalization.

A system and/or method, for example, can produce a semantic parse of an input text, e.g., by extending an off-the-shelf large language model (LLM) to produce directed acyclic graph (DAG)-based semantic parses of natural language input in a bottom-up fashion. Changes to LLM can be minimal. In an embodiment, structured data in the form of s-expressions (or symbolic expressions) can be used. A tree can be represented by an s-expression where the nodes of the tree are represented by symbols of the s-expression, which can be nested. Relative positional encoding scheme that encodes each node relative to its ancestors according to a post-order traversal can also be used. In an aspect, a system and/or method can treat parsing as a process of generating parsing actions, e.g., rather than graph nodes, in the context of bottom-up semantic parsing.

In computers that process natural language, semantic parsing can be performed where, given a natural language utterance, a semantic representation of that utterance is produced, e.g., "How many rivers are in S0?". In an embodiment, structures that a system and/or method generates have the unique characteristic that they are directed acyclic graphs (DAGs) where semantics are determined from the bottom up. For example, subgraph of a directed acyclic graph (DAG) has a meaning.

In an aspect, a system and/or method can take individual components and combine them together, e.g., make neural network models (e.g., semantic parser) compositionally generalize. The ability to take individual components and combine them together is known as compositional generalization. Having computers, e.g., neural network models perform compositional generalization has been a challenge in neural network methods for semantic parsing. A bottom-up methodology disclosed herein can improve compositional generation in computer neural network models.

Figure 2:
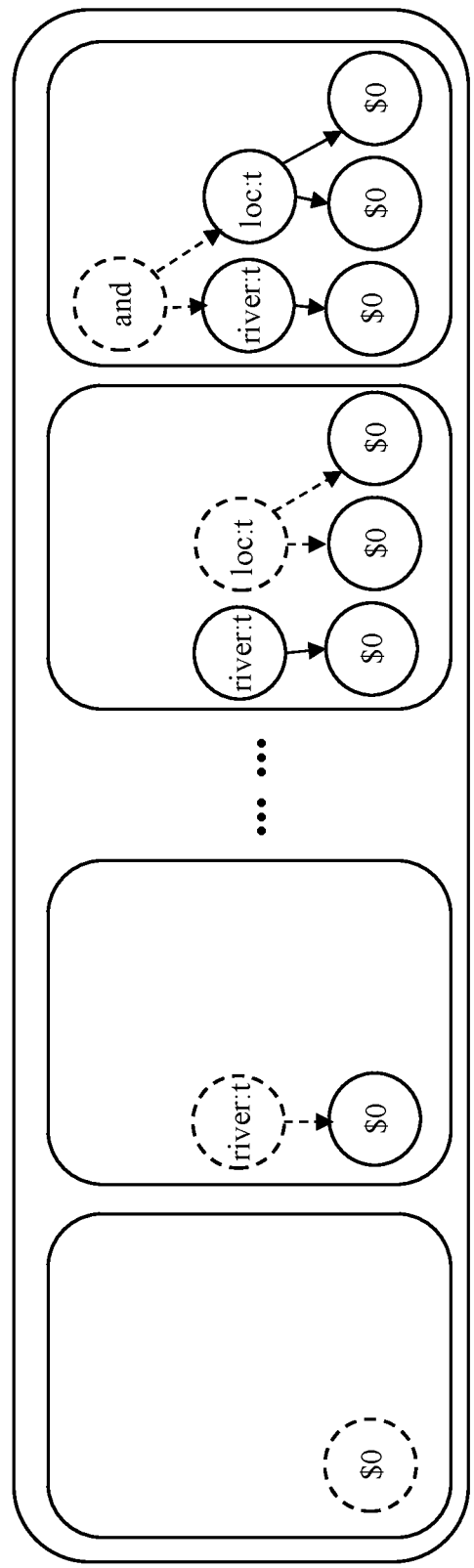
FIG. 2 is a diagram illustrating a bottom-up approach in an embodiment.

In an aspect, neural semantic parsers treat parsing as an encoder-decoder problem, where the decoder generates logical forms, e.g., outputs a linearization of the target logical form's abstract syntax tree. In an embodiment, a decoder disclosed herein, which can be used in neural sematic parsers, implements a bottom-up decoding approach. FIG. 2 is a diagram illustrating a bottom-up approach in an embodiment. An example illustrated performs bottom-up decoding for an example query question "What rivers are in s0?" A bottom-up approach builds a tree graph structure upwards by combining entities and subexpressions together to form larger subexpressions. The nodes drawn with dotted lines are those being generated. In an embodiment, a decoder generates logical forms by conditioning on only the relevant subexpressions from the overall graph, hence improving compositional generalizability. For instance, a bottom-up approach that generates a new parent node conditioned on only its arguments should generalize better. In an aspect, an evaluation scheme is also disclosed that can mitigate a possibly large number of subexpressions, which may be created at each decoding step, by selectively expanding the logical form in a way that minimizes computational overhead.

In an embodiment, a neural semantic parser disclosed herein can be task-agnostic, with as few as possible assumptions made regarding the particular formalism (e.g., Structured query language (SQL), SPARQL Protocol and RDF Query Language (SPARQL), etc.) a logical form may instantiate. For example, the neural semantic parser can work with a vocabulary V that defines the set of all symbols a logical form could be constructed from (with no restrictions imposed as to the label or arity of any particular symbol) and a logical form given as an s-expression.

In an embodiment, a system and/or method, for example, implementing a semantic parser, can generate s-expressions. S-expressions are a representation formalism that expresses trees as nested lists. For example, (count $0 (river: t $0)) is an example of an s-expression that represents a query for the question "How many rivers are there?". S-expressions used herein can simplify the structure of logical forms into binary trees. In an aspect, the transformation of logical forms into s-expressions requires no knowledge beyond the syntax of the target formalism.

Figure 3A:
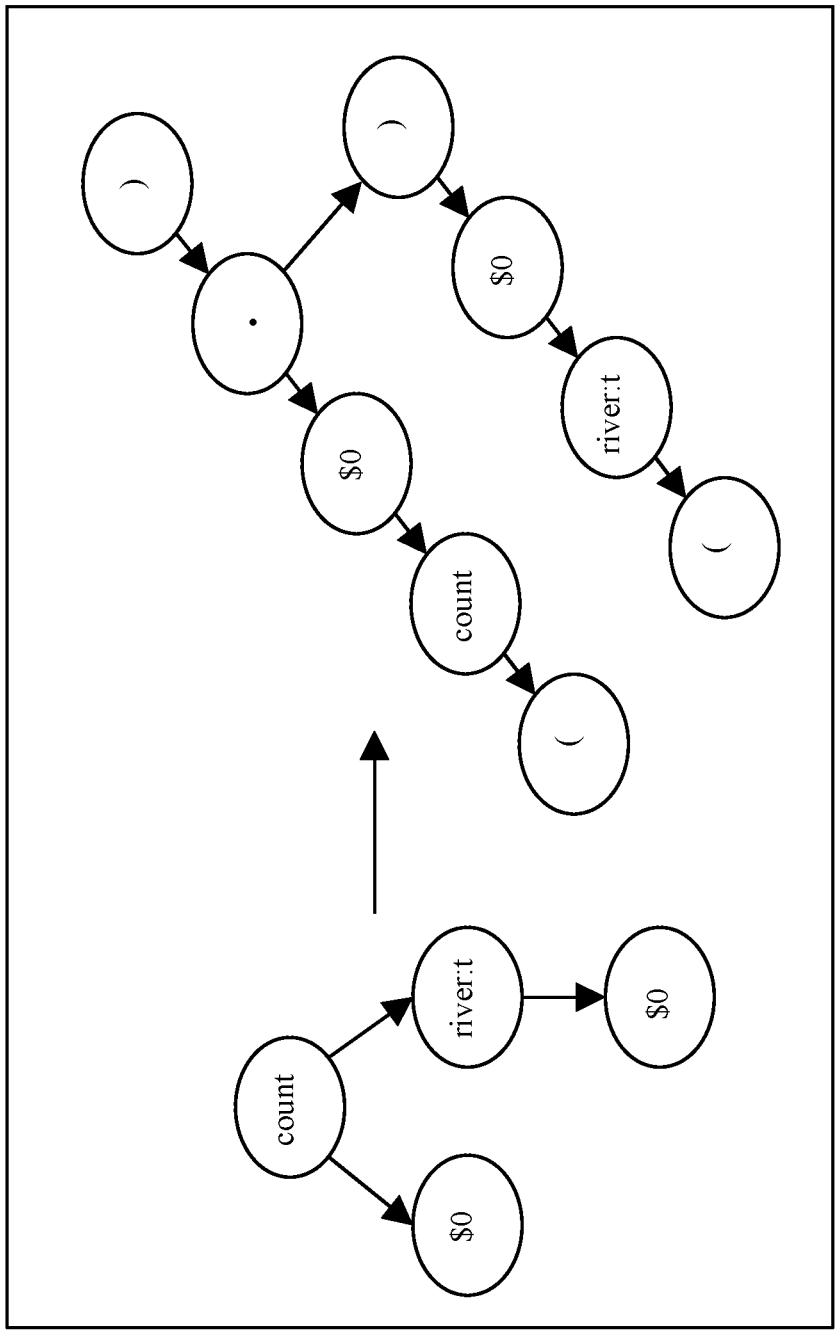
FIGS. 3A and 3B illustrate preprocessing graph transformation in an embodiment.
Figure 3B:
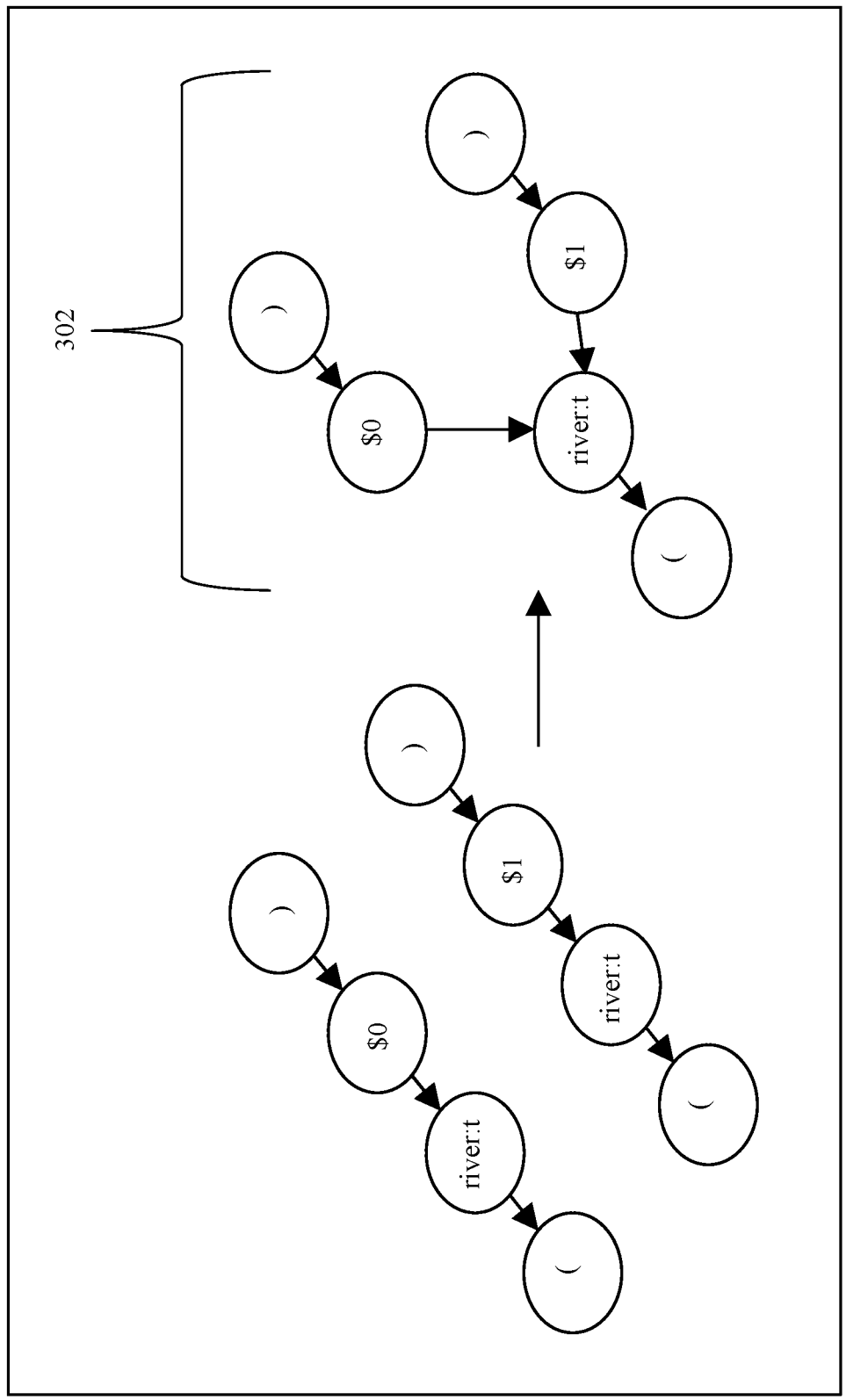

In an embodiment, a system and/or method, for example, implementing a semantic parser represent logical forms as directed acyclic graphs (DAGs). The use of DAGs allows a method to not repeatedly decode the same subtrees. In this way programming efficiency and savings in storage (e.g., computer memory) can be achieved. This is a logically equivalent representation that is created by collapsing all identical subtrees into a single subgraph that maintains connections to each of the original parent nodes. FIGS. 3A and 3B illustrate preprocessing graph transformation in an embodiment. In some embodiment, all logical forms follow the format as shown at 302. For instance, training data given to a model (neural semantic parser) is preprocessed such that the logical forms fit into that format. The model's output can be converted back to the original format. In some embodiments, the preprocessing transformation is lossless. FIG. 3A provides an example of how an s-expression would initially be converted into a tree representation. FIG. 3A shows an internal conversion of the logical form (count $0 (river: t $0)) into a tree-based s-expression for the question "How many rivers are there?". FIG. 3B shows how two overlapping trees would be merged into a single DAG form. FIG. 3B shows DAG representation of an s-expression where identical subtrees have been mapped to the same nodes. Within a graph all nodes can either have 1) one argument and a label drawn from the vocabulary of symbols V or 2) two arguments and connect an incomplete list (its left argument) with a complete list (its right argument). The nodes with two arguments can always use a special pointer symbol "•" as their label.

As another preprocessing step, each logical form is wrapped in a special root s-expression. For instance, the logical form (count $0 (river: t $0)) would become (root (count $0 (river: t $0))). This root token provides a signal to a neural semantic parser model (e.g., the decoder) to stop generating new extensions to the logical form. During decoding, in an embodiment, only those s-expressions that begin with a root token may be returned to the user.

Model (e.g., Neural Semantic Parser)

Given a question Q, a system and/or method, in an embodiment, is tasked with producing a graph representation G of a logical form using symbols drawn from a vocabulary V. At the highest level, the system and/or method can follow a traditional encoder-decoder paradigm. For example, a neural semantic parser model (also referred to as a model, for brevity) first parses the input (e.g., natural language text or utterance) with a neural encoder (e.g., long short term memory (LSTM)) to produce real-valued vector representations for each word in Q. Those representations are then passed to a neural decoder, which iteratively takes decoding actions to generate G. A decoder of the model is also referred to as a neural decoder. The method is agnostic to the choice of encoder, e.g., any encoder can be used. The following describes a decoding process in one or more embodiments. Neural encoder and neural decoder refer to encoder and decoder of the semantic parser having neural network architecture.

In an aspect, a pretrained large language model used as the base in the method can be left largely as is. For example, the method need not involve changes to the internal parameters or architecture of the neural model itself. For example, all additions can be kept to the output layer. Consequently, in an embodiment, when the method in an embodiment is instantiated with a pretrained language model, that model can be applied entirely off-the-shelf.

Decoding Action

At each step of decoding, a method and/or system executes either a generation action or a pointer action. Generation actions take a single node from G and add it as the argument to a new node with a label drawn from V. Pointer actions instead take two nodes from G and add them both as arguments to a new node with a special pointer symbol "•" as its label. Both action types result in a new node being generated that has as arguments either one or two already-existing nodes from G, i.e., a bottom-up generation process.

Figure 4:
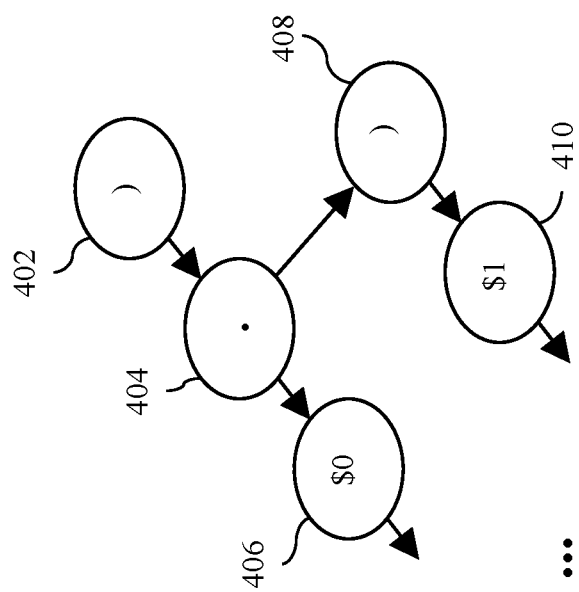
FIG. 4 illustrates decoding actions in an embodiment.

FIG. 4 illustrates decoding actions in an embodiment, and illustrates the outcomes of both action types. Nodes in G originating from generation actions are shown at 402, 406, 408 and 410 and a node from pointer actions is shown at 404. At the start of decoding, the method initializes two objects, G as the empty graph and a set of candidate actions A={<(,∅,1>}. The first action of A can always be to generate the left parenthesis, which is the start to every s-expression in G. Each decoding step begins by extending G with actions drawn from A and ends with a set of new candidate actions being added to A.

In an aspect, an evaluation scheme, also referred to as a lazy evaluation scheme, can be provided where actions that create nodes are generated at each decoding step, rather than the nodes themselves. This allows the model to strongly restrict how G expands at each decoding step, with the method being able to build up a large set of unexecuted actions representing candidate logical forms that are never processed with resource-intensive neural components and thus incur very little computational overhead.

Candidate Selection

Figure 5:
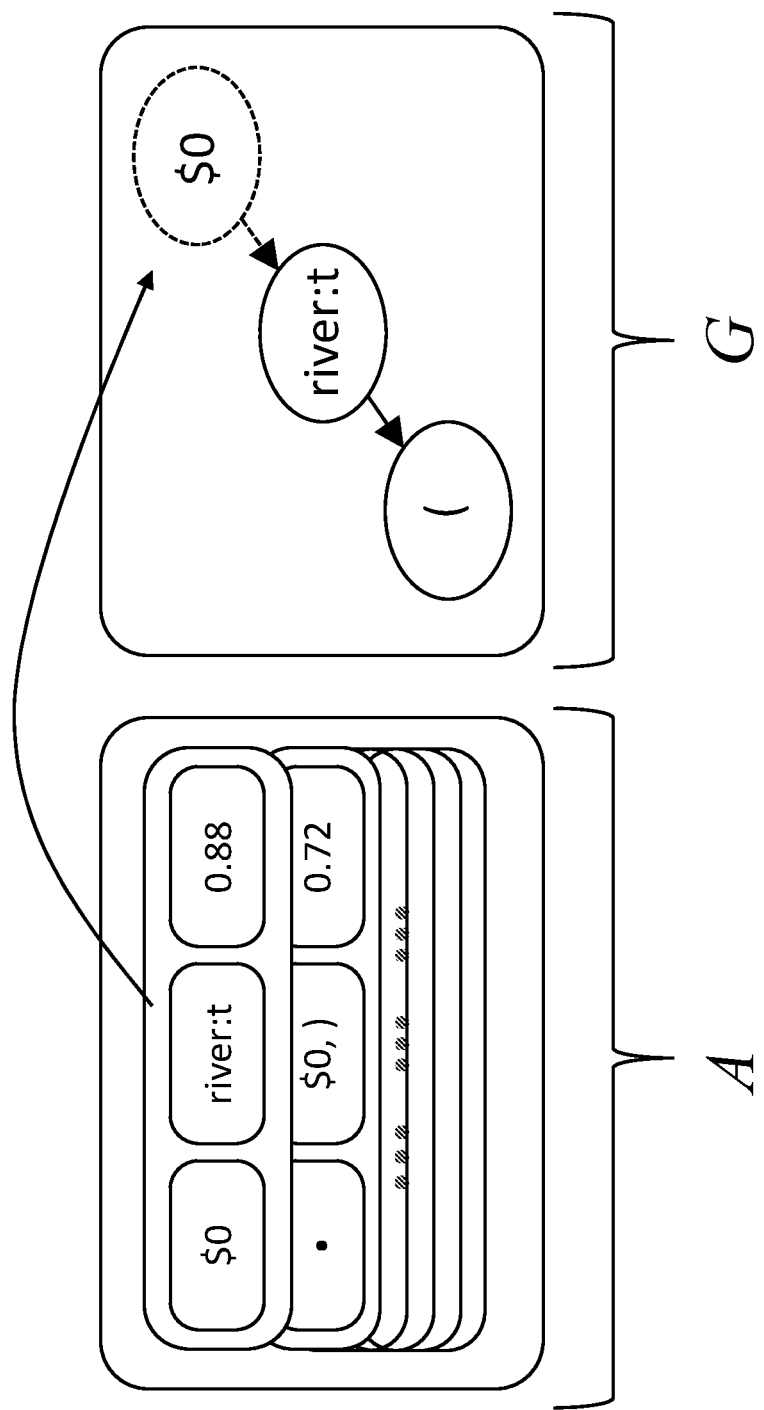
FIG. 5 illustrates a generation action in an embodiment.

Each element $\alpha \in A$ is a tuple $\alpha=<v, \mathcal{A}, p_a>$ consisting of: 1) a symbol v drawn from vocabulary V, 2) an ordered list of arguments $\mathcal{A}$, where each member of $\mathcal{A}$ is a node in G, and 3) a probability $p_a$ reflective of the model's confidence that this candidate should be part of the final returned output. Adding a candidate $a=<v, \mathcal{A}, p_a>$ to G involves creating a new node labeled v within G that has directed edges connecting the node to each argument in $\mathcal{A}$. FIG. 5 illustrates a generation action in an embodiment. For example, a generation action from A that, when selected and executed, adds a node with label $0 to G.

The model can be equipped with a selection function that can select and remove members of A to add to G. In an embodiment, for example, a selection function can choose all elements of A with a probability above a pre-defined threshold K (e.g., κ=0.5) or, if no such options exist, choose the single highest probability option from A.

Graph Encoding

For a neural semantic parser model to make predictions, it first converts the newly generated nodes into real-valued vector representations. A decoder in an embodiment can follow a design of a transformer using relative positional encodings, but with modifications that allow it to process graph structure. A frontier F can be defined to refer to the set of nodes generated by actions in A that were selected during the current cycle of decoding. Each element of F is first assigned a vector embedding according to its label. The embedding is then passed through the decoder to produce real-valued vector representations for each node. In order to capture the structure of G with the transformer, the model makes use of two types of information within the attention modules of each layer of the decoder.

First, within the self-attention module, a node $n \in G$ may only attend to its set of descendants, i.e., only the nodes contained within the subgraph of G rooted at n. This has the effect that the resultant encoding of a node is a function of only its descendants and the original text. Second, for a pair of nodes $n_i$ and $n_j$ for which an attention score is being computed (e.g., $n_i$ is the parent of $n_j$), the positional encoding bias $b_{ij}$ used to represent the offset between $n_i$ and $n_j$ is assigned according to a reverse post-order traversal of the descendants of node $n_i$. That is, $b_{ij}$ is selected according to where $n_j$ is positioned in a post-order traversal of the subgraph of G rooted at $n_i$.

Figure 6:
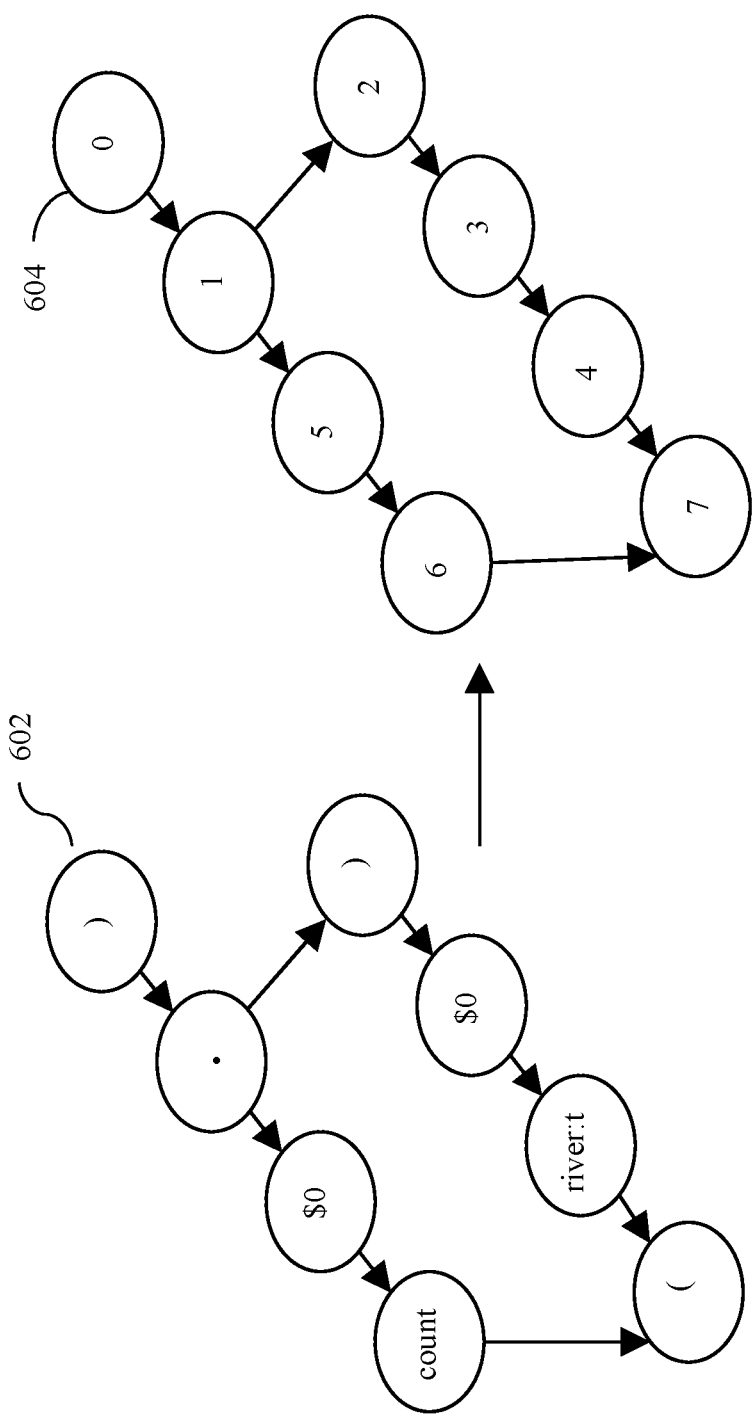
FIG. 6 provides an example ordering scheme for a particular node in an embodiment.

FIG. 6 provides an example of this ordering scheme for a particular node. Reversed post-order traversal-based position assignment relative to a newly generated node 602, 604 is shown. The number assigned to each node is the index of the position bias (e.g., 0 would be assigned to bias $b_0$, 1 would be assigned to bias $b_1$, etc.). This assignment strategy effectively linearizes the graph rooted at $n_i$ and has the added property that each descendant of $n_i$ will be assigned a unique position bias with respect to $n_i$.

Action Generation

Figure 7:
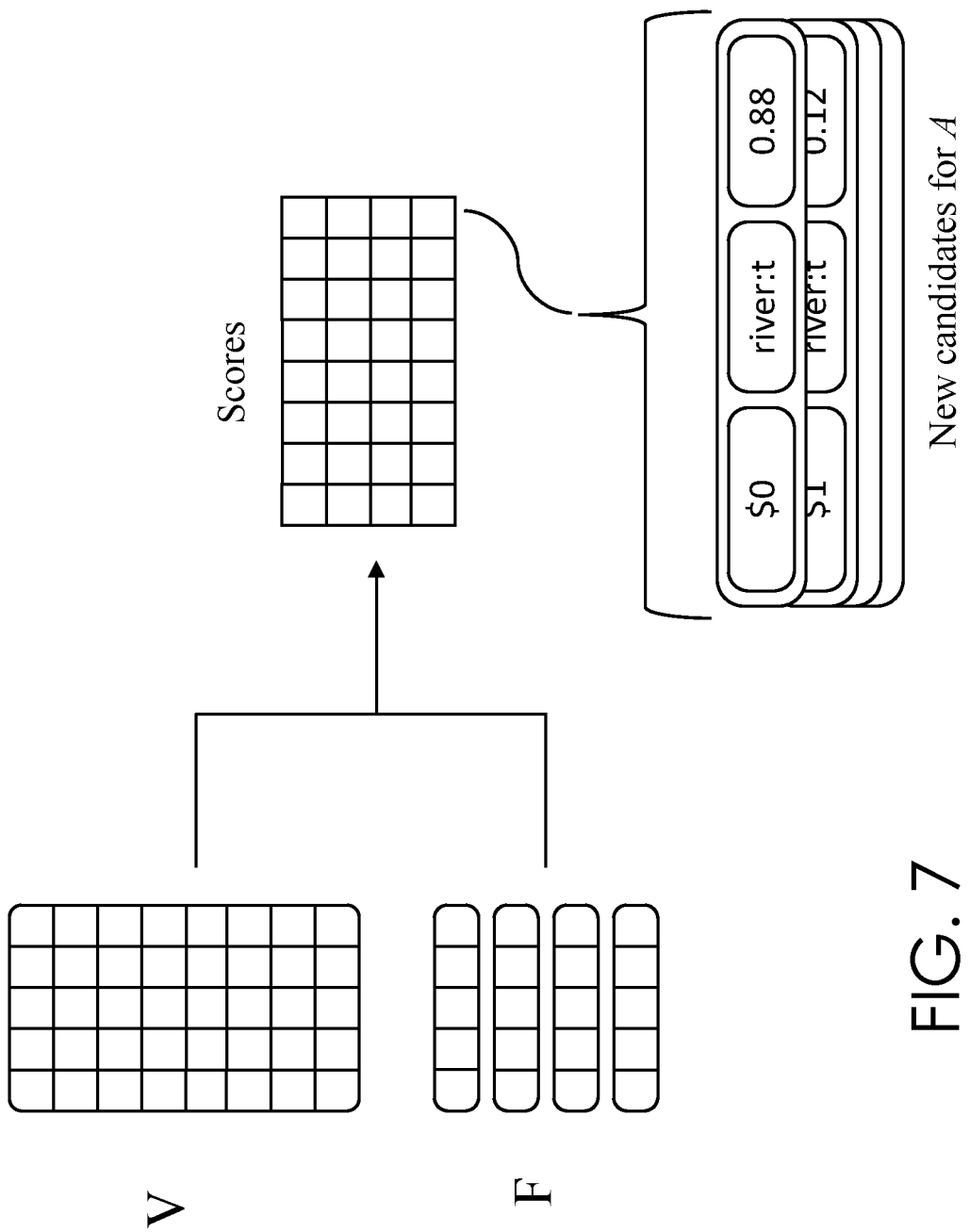
FIG. 7 shows constructing new generation actions in an embodiment.

Once the decoder has processed each node (e.g., newly generated nodes in F) the method will have a set of node embeddings $\{h_1, h_2, \ldots h_{|F|}\}$. For instance, each cycle of decoding adds nodes generated by actions executed from A to the set of frontier nodes F (where F is a subset of the overall graph G). The set of node embeddings $\{h_1, h_2, \ldots h_{|F|}\}$ are produced by the decoder for nodes of F. To produce the set of decoding actions, the neural model executes two operations (one for each action type). The first operation proposes a set of generation actions. FIG. 7 shows constructing new generation actions in an embodiment. FIG. 7 shows the embeddings of nodes in the frontier F and the embeddings of symbols in the vocabulary V being used to construct new generation actions. For a node $n_i$ and symbol v with embedded representations $h_i$ and $h_v$, respectively, this involves computing $$2p_i^{(v)} = \sigma(h_i^T h_v + b)$$

where b is a bias term and σ is the sigmoid function. The T symbol represents "transpose". The bias term is learned. The value $p_i^{(v)}$ can be interpreted as the independent probability (independent of all other action probabilities) that G should contain a node with label v∈V that has $n_i$ as an argument. For each v∈V, A is extended as A=A∪{<v, <$n_i$>, $p_i^{(v)} \cdot p_{n_i}$>}, where $p_{n_i}$ refers to the probability of the original action that generated $n_i$.

The second operation proposes a set of pointer actions using an attention mechanism. For a pair of nodes <$n_i$, $n_j$> with embedded representations $h_i$ and $h_j$, respectively, this is computed as $$2 q_i = W^{(q)} h_i, \; k_j = W^{(k)} h_j$$

$$p_i^{(j)} = \sigma\left(\frac{q_i^T k_j}{\sqrt{d}} + b\right)$$

where $W^{(q)}$, $W^{(k)}$ are learned matrices, b is a bias term, d is the dimensionality of the embeddings, and σ is the sigmoid function. Like before, $p_i^{(j)}$ can be thought of as the independent probability that G will contain a node that has $n_i$ as its left argument and $n_j$ as its right argument. For each pair <$n_i$, $n_j$>∈(F×G)∪(G×F) (where F∪G is a slight abuse of notation to write the union between F and the set of nodes within G), the method updates the set of actions A=A∪{<·, <$n_i$, $n_j$>, $p_i^{(j)} \cdot p_{n_i} \cdot p_{n_j}$>}, where $p_{n_i}$ and $p_{n_j}$ refer to the probabilities of the original actions that generated $n_i$ and $n_j$.

In some embodiments, the probability for an action is the product of 1) the sigmoid output layer's score and 2) the probabilities of the parent actions. This is a somewhat recursive definition, as the parent actions probabilities are, likewise, the products of their sigmoid output layer's score and the probabilities of their parent actions. The first action (which has no parents and is taken by default) has probability 1.

Generating new actions may exhibit combinatorial nature. At each cycle of decoding, the number of actions may grow, e.g., by O(|F|·|V|+|F|·|G|). While it is possible to restrict the number of actions added to A (e.g., by adding only the top-k actions), the set may still grows quickly.

In an embodiment, a decoding scheme disclosed herein does not actually build and embed the graphs for a particular action until that action is executed. Because each action maintains the probability of its source actions, the model is effectively exploring via Dijkstra's algorithm, where the frontier F includes actions in A that were executed. The set of new nodes added to the graph is the frontier F. Thus, this approach does not need to discard these nodes since they have no significant cost until they are executed.

Terminating Decoding

Decoding terminates when an s-expression beginning with the root token is generated. In an embodiment, in order to ensure the highest probability s-expression is returned, decoding only terminates if the final action's probability is also the highest amongst all yet-unselected actions in A. Upon generating the root s-expression, only the subgraph of G rooted at the newly generated node is returned. Thus, though the size of G may grow to be quite large, not every element of G is returned. For example, recall that one of the preprocessing steps added a root token, as a signal to the decoder to stop decoding.

Training

Training a model is as efficient as other standard transformer-based models, i.e., a single parallel operation that processes the entire graph and computes all action probabilities simultaneously. Additionally, the memory footprint of the model is practically equivalent to the underlying transformer used to initialize its parameters.

The loss function used to train the model can be a cross-entropy-based loss. Other functions can be used. In an embodiment, as described above, both generation and pointer action probabilities can be the output of a sigmoid function. Letting Q be the input question, P be the set of positive actions (i.e., actions needed to generate the gold-annotation logical form), and N be the set of negative actions (i.e., actions not needed to generate the gold-annotation logical form), the objective is written as $$2 \mathcal{L} = \sum_{n \in \mathcal{P}} \log p_\theta(n \mid Q) + \sum_{n \in \mathcal{N}} 1 - \log 1 - p_\theta(n \mid Q)$$

where the conditional probabilities $p_\theta(n|Q)$ are the sigmoid-constrained outputs of generation and θ is the set of model parameters.

While $\mathcal{P}$ is fixed and finite, the set $\mathcal{P}$ is unbounded. In an embodiment, the method can construct $\mathcal{P}$ from a small set of both generation and pointer actions. For each node n∈G, the method can add negative generation actions for each symbol v∈V that is not the label of a parent of n. For negative pointer actions, the method can add actions for each pair of nodes in G that do not have a common parent.

In an aspect, a bottom-up decoding technique disclosed herein can be used for semantic parsing, which generates machine interpretable meaning representation (e.g., logical form) of a natural language expression. In an aspect, the bottom-up decoding scheme can semi-autoregressively construct logical forms in a way that facilitates compositional generalization.

Figure 8:
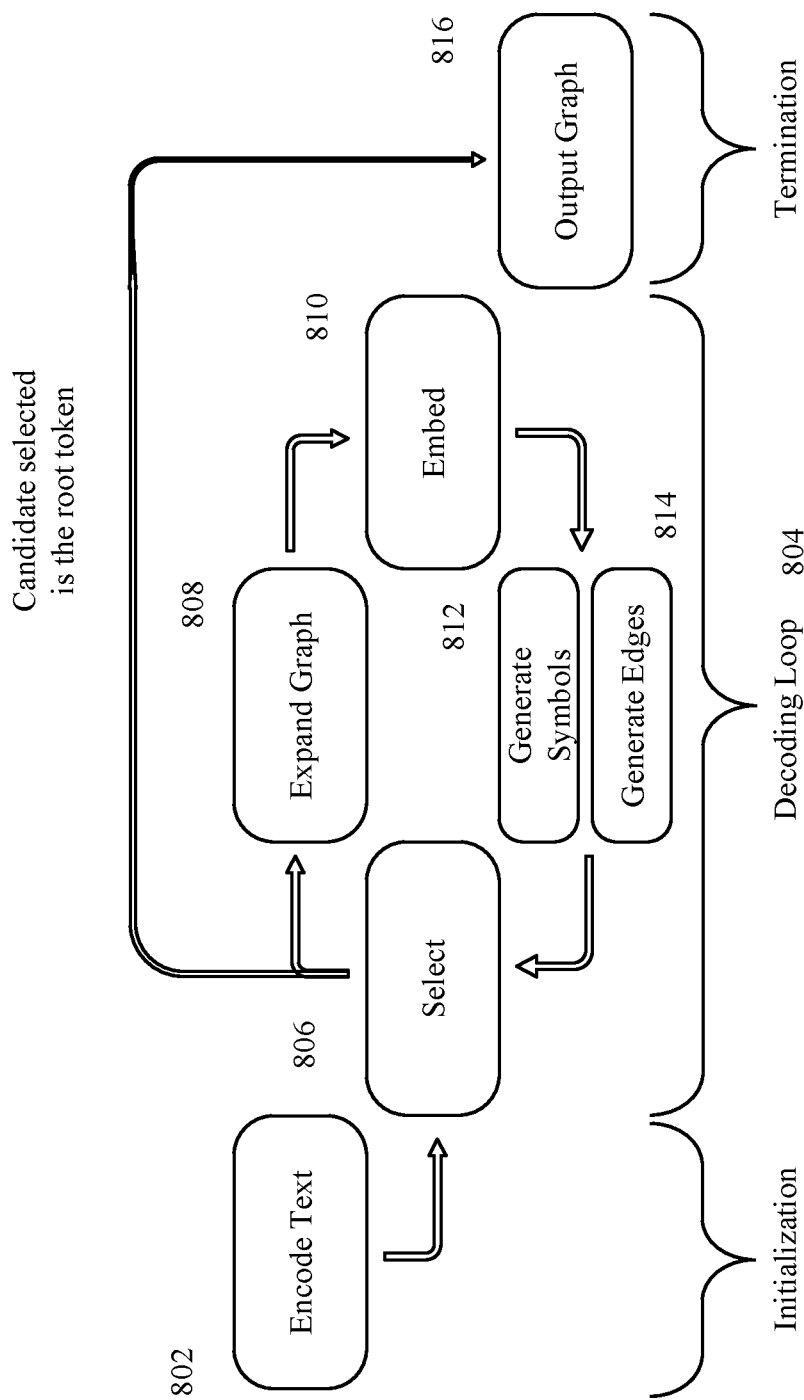
FIG. 8 is a system diagram illustrating components of a system that can implement a neural semantic parser in an embodiment.

FIG. 8 is a system design diagram illustrating components of a system that can implement a neural semantic parser in an embodiment. One or more computer processors can run or perform the processing of the components of the system. In an embodiment the neural semantic parser has autoencoder (e.g., encoder-decoder) neural network architecture. As described above, a system that implements a neural semantic parser, in an aspect, treats generation (e.g., decoding to generate a logical form of the input text) as an incremental, bottom-up process, which generates graph G with elements from vocabulary V. There can be two types of actions: Generation action; and Pointer action. Generation actions take a single node from G and add it as the argument to a new node with a label drawn from V. Pointer actions take two nodes from G and add them both as arguments to a new node. At each generation step, the following can be performed: Select best action from unprocessed action set A (e.g., described above with reference to candidate selection); Execute action and add new nodes to G (e.g., described above with reference to candidate selection); From G, score all possible new actions and add them to unprocessed set (e.g., described above with reference to action generation). Scores of actions are also referred to as probabilities or independent probabilities, e.g., described above with reference to action generation.

At 802, text can be processed with standard language model. The text can be a natural language expression or utterance. For example, an encoder of a language model encodes the text into a vector of vocabulary, producing an encoding of that text. The encoded text is passed to a decoder.

Decoding loop 804 shows the decoder processing a graph that it has been building in bottom-up fashion iteratively. At

806, the decoder selects an action from a priority queue of actions, e.g., shown in FIG. 5. For example, the decoder selects a top scoring action or a highest probability action from the priority queue of actions. It can be noted that only a subset (e.g., small subset) of possible actions are selected at each step. In the first instance of the iteration in the decoding loop 804, the priority queue of action can have an action associated with adding one base leaf node as default, and that action can be selected at 806, to start building the graph. For example, the priority queue can be initialized with one action to take or execute.

At 808, the decoder executes the selected action. Executing the selected action adds a new node to the graph, e.g., expands the graph. Expanding the graph pairs the new node with its arguments.

Once the graph is expanded with the new node, at 810 the decoder processes the new node, e.g., by embedding it with the language model. Embedding at 810 can be performed according to graph encoding described above. For example, at 810, graph embedding can be done with off-the-shelf language model (e.g., LLM) that uses post-order traversal-based relative positional encodings.

At 812 and 814, using the embeddings of the newly added node and embedding of all other nodes in the graph, the decoder generates a new set of possible actions, for example, which pairs of nodes should be connected to a parent node 814 (e.g., selecting two nodes and identifying that they have a common parent), whether to create a new node 812 (e.g., add a new symbol, not yet connected to other nodes). For example, a symbol is packaged with arguments, given a score (referred to above as independent probability), and added to the priority queue of action. In an embodiment, at 814, attention mechanism on top of standard encoder-decoder generates edges. The attention mechanism computes the sigmoid attention score between a node and all other nodes in G. That sigmoid score becomes part of its action probability. A new set of possible actions produced at 812 and 814 can be more than one new action, and are added to the priority queue of actions. The priority queue can be sorted according to the scores associated with the actions. Generating of actions at 812 and 814 can be performed according to action generation described above. Generation of actions produces actions that may or may not be executed (taken to be executed, in the next iteration 806). Hence, generating of actions does not always result in adding nodes representing symbols to the graph. For example, the actions generated at a particular decoding step need not be taken. For example, an action executed during a fifth decoding iteration may have been generated during a first decoding iteration, and an action generated at the fifth decoding iteration might not get executed during any decoding iterations.

The decoding step iterates, for example, repeats selecting an action from the priority queue 806, executing the selected action and expanding the graph 808, embedding 810 and generating actions 812, 814, e.g., as shown in the decoding loop 804. The iteration builds the graph.

The iteration stops on meeting a criterion. For example, the decoding loop 804 builds the graph until the decoder creates a special token, a root token. For example, the decoder selects an action from the priority queue at 806 that has a root node (e.g., annotated with a special label) in it and expands and embeds it.

At 816, the built graph with the root node in it is returned as a logical form of the input the text, e.g., natural language expression.

Each action in the priority queue can have a score (e.g., probability or independent probability) such that the actions are ranked in the priority queue, where the selection at 806 selects an action to execute based on the score. Generation action scores can be computed by performing a cross product between newly expanded nodes (e.g., in F) and the vocabulary (V). Pointer action scores can be computed by performing a cross product between newly expanded nodes (e.g., in F) and the graph (G).

For example, in some embodiments, generation action scores are computed by a matrix multiplication (followed by a sigmoid) between the frontier node embeddings and the vocabulary node embeddings. In some embodiments, pointer action scores are computed as a sigmoid attention mechanism between frontier node embeddings and the node embeddings for each node in G (including those in F). F is a subset of G (the subset of newly generated nodes).

Figure 9:
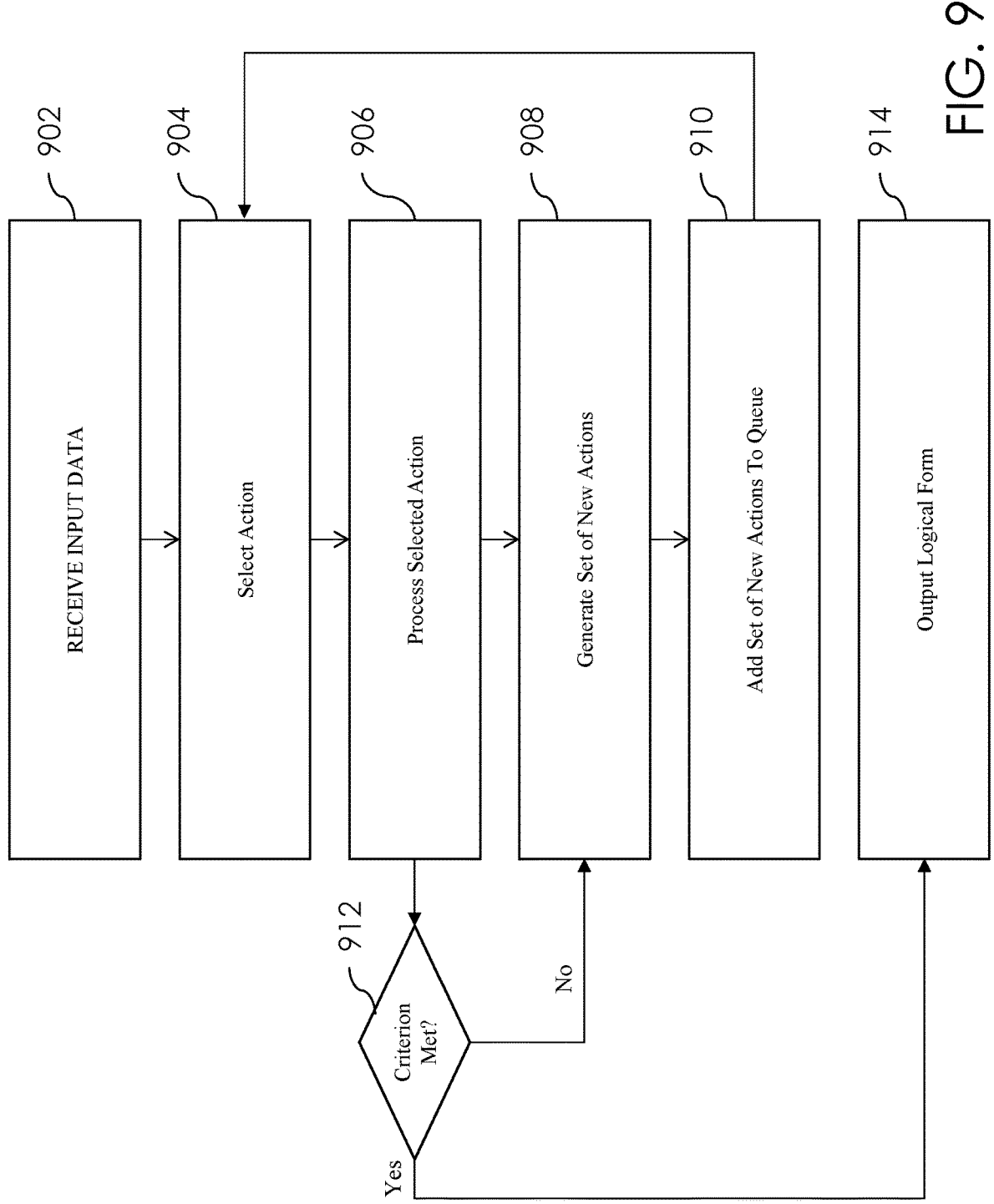
FIG. 9 is a flow diagram illustrating a method in one embodiment.

FIG. 9 is a flow diagram illustrating a method in one embodiment. The method can provide neural semantic parsing in an embodiment. The method can be performed and/or implemented by one or more computer processors, for example, including one or more hardware processors. By way of example, one or more computer processors described above with reference to FIG. 1 can be used. At 902, the method can include receiving input data associated with a natural language expression. For example, as shown in FIG. 8, and also described above an encoder of a neural semantic parser may receive a natural language expression or utterance and encode the received natural language expression into a vector of vocabulary, vector representations for each word, which can be processed by a machine. The input data can be encoded data, e.g., vector representations.

At 904, an action can be selected from a queue of actions, e.g., by a decoder of a neural semantic parser. As described above, the queue of actions stores at least one action, the action being associated with an element from the vocabulary of the natural language expression. In an embodiment, as described above, each action can be represented by a tuple that includes a symbol (element) drawn from the vocabulary, an ordered list of arguments, where each member of the ordered list is a node in a tree structure, and a probability reflective of the decoder's (or neural semantic parser's) confidence that this candidate (element) should be part of the tree structure, e.g., a returned output representing a logical form of the natural language expression.

At 906, the selected action can be processed (also referred to above as being executed), e.g., by the decoder of the neural semantic parser, to build a tree structure. In an embodiment, the action can be selected based on the action meeting a threshold probability that the element is to be used in expanding the tree structure. In another embodiment, the action can be selected that has the highest probability among the actions in the queue, that the element is to be used in expanding the tree structure. As described above, processing of the selected action expands the tree structure with a node representing the element. For example, an action can include a generation action that makes the node a parent to an existing single node in the tree structure. As another example, an action can include a pointer action that makes the node a parent to an existing pair of sibling nodes in the tree structure. As described above, the tree structure is expanded bottom-up. In an embodiment, the tree structure is a directed acyclic graph (DAG).

At 908, a set of new actions can be generated, e.g., by the decoder, based on the node associated with the selected action and the vocabulary. In an embodiment, as described above with reference to action generation, generating the set of new actions can further include determining a probability that the tree structure should contain a new node representing an element of the vocabulary that has the node as an argument. In an embodiment, as described above with reference to action generation, generating the set of new actions can further include determining a probability that the tree structure should contain a new node representing an element of the vocabulary that has a pair of nodes in the tree structure as a left argument and a right argument.

At 910, the set of new actions are added to the queue of action, e.g., by the decoder. The method can include repeating the selecting 904, processing 906, generating 908 and adding 910, until a criterion is met. The criterion can be that the action selected at 904 contains an element that would represent a root node for the tree structure. Once the tree structure is expanded with the root node, the iteration can stop, e.g., as shown at 912.

At 914, the built tree structure can be output as a logical form. The logical form represents a machine interpretable meaning (semantic) representation of the natural language expression. In an aspect, the logical form can be provided as an s-expression that represents the tree structure.

In an aspect, the logical form can be further used by a machine, e.g., to perform automatic language translation and/or other language processing. By way of example use cases, the output logical form may be a logical form that may be run on a knowledge base to answer a question, for example, in an automated question and answering system. As another example, the output logical form may be a mathematical expression that may be run to determine a numerical answer to a question, for example, as part of a chatbot or another question and answering system. As another example, the output logical form may be a logical form that may be added to a knowledge base. As another example, the output logical form may be a computer code that may be evaluated to return an answer.

Figure 10:
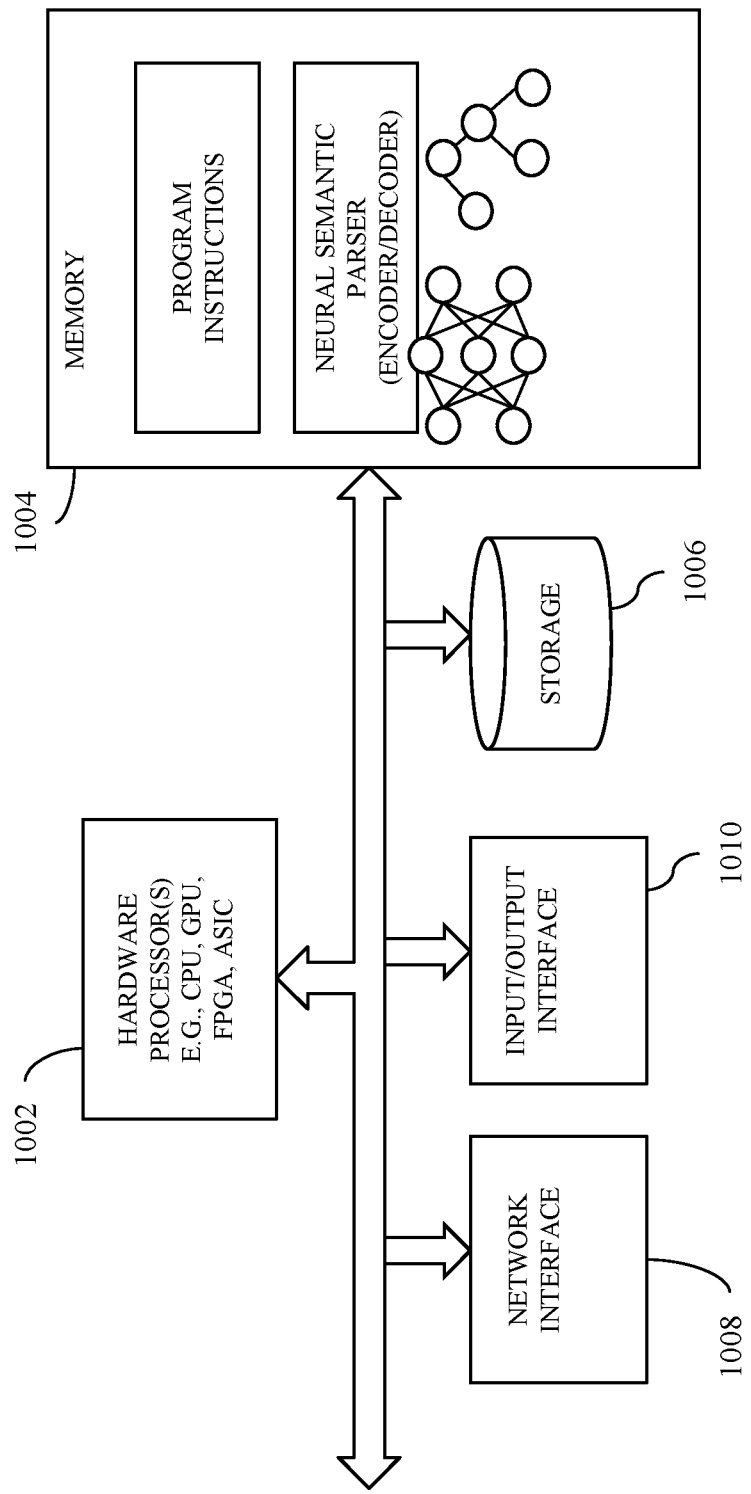
FIG. 10 is a diagram showing components of a system in one embodiment that can perform neural semantic parser techniques disclosed herein.

FIG. 10 is a diagram showing components of a system in one embodiment that can perform neural semantic parser techniques disclosed herein. One or more hardware processors 1002 such as a central processing unit (CPU), a graphic process unit (GPU), and/or a Field Programmable Gate Array (FPGA), an application specific integrated circuit (ASIC), and/or another processor, may be coupled with a memory device 1004, and perform encoding and/or decoding functions of a neural semantic parser. A memory device 1004 may include random access memory (RAM), read-only memory (ROM) or another memory device, and may store data and/or processor instructions for implementing various functionalities associated with the methods and/or systems described herein. One or more processors 1002 may execute computer instructions stored in memory 1004 or received from another computer device or medium. A memory device 1004 may, for example, store instructions and/or data for functioning of one or more hardware processors 1002, and may include an operating system and other program of instructions and/or data. One or more hardware processors 1002 may receive input data associated with a natural language expression. For instance, at least one hardware processor 1002 may perform decoder functionalities described herein to output a logical form of the natural language expression. For example, one or more hardware processors 1002 may select an action from a queue of actions, the queue of actions storing at least one action, the action being associated with an element from vocabulary of the natural language expression. One or more hardware processors 1002 may process the selected action to build a tree structure, where the processing of the selected action expands the tree structure with a node representing the element, where the tree structure is expanded bottom-up. One or more hardware processors 1002 may also generate a set of new actions based on the node associated with the selected action and the vocabulary. One or more hardware processors 1002 may add the set of new actions to the queue of actions, and repeat selecting, processing, generating and adding until a criterion is met, e.g., a root node is reached. One or more hardware processors 1002 may output a logical form of the natural language expression, the logical form being a machine interpretable meaning representation of the input data, where the logical form is provided as an s-expression representing the tree structure, where symbols of the s-expression represent nodes of the tree structure. In one aspect, input data may be stored in a storage device 1006 or received via a network interface 1008 from a remote device, and may be temporarily loaded into a memory device 1004 for providing the output logical form. A neural semantic parser that can be trained can also be stored on a memory device 1004, for example, for running by one or more hardware processors 1002. One or more hardware processors 1002 may be coupled with interface devices such as a network interface 1008 for communicating with remote systems, for example, via a network, and an input/output interface 1010 for communicating with input and/or output devices such as a keyboard, mouse, display, and/or others.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:

receiving input data associated with a natural language expression;

selecting an action from a queue of actions, by a decoder of a neural semantic parser, the queue of actions storing at least one action, the action being associated with an element from vocabulary of the natural language expression;

processing the selected action to build a tree structure, by the decoder, wherein the processing of the selected action expands the tree structure with a node representing the element, wherein the tree structure is expanded bottom-up;

generating, by the decoder, a set of new actions based on the node associated with the selected action and the vocabulary, wherein each action in the set of new actions is a tuple representing a symbol drawn from the vocabulary, an ordered list of arguments, wherein each of the arguments is a node in the tree structure, and a probability that the symbol should be part of a returned output;

adding, by the decoder, the set of new actions to the queue of actions;

repeating, by the decoder, the selecting, processing, generating and adding until a criterion is met; and outputting, by a decoder of a neural semantic parser, a logical form of the natural language expression, the logical form being a machine interpretable meaning representation of the input data, wherein the logical form is provided as an s-expression representing the tree structure, wherein symbols of the s-expression represent nodes of the tree structure.

2. The computer-implemented method of claim 1, wherein the tree structure is a directed acyclic graph (DAG).

3. The computer-implemented method of claim 1, wherein the action is selected based on the action meeting a threshold probability that the element is to be used in expanding the tree structure.

4. The computer-implemented method of claim 1, wherein the action is selected that has highest probability that the element is to be used in expanding the tree structure.

5. The computer-implemented method of claim 1, wherein the generating the set of new actions based on the node associated with the selected action and the vocabulary further includes, determining a probability that the tree structure should contain a new node representing an element of the vocabulary that has the node as an argument.

6. The computer-implemented method of claim 1, wherein the generating the set of new actions based on the node associated with the selected action and the vocabulary further includes, determining a probability that the tree structure should contain a new node representing an element of the vocabulary that has a pair of nodes in the tree structure as a left argument and a right argument.

7. The computer-implemented method of claim 1, wherein the action includes a generation action that makes the node a parent to an existing single node in the tree structure.

8. The computer-implemented method of claim 1, wherein the action includes a pointer action that makes the node a parent to an existing pair of sibling nodes in the tree structure.

9. A computer program product comprising a computer readable storage medium having program instructions embodied therewith, the program instructions readable by a device to cause the device to:

receive input data associated with a natural language expression;

select an action from a queue of actions the queue of actions storing at least one action, the action being associated with an element from vocabulary of the natural language expression;

process the selected action to build a tree structure wherein the processing of the selected action expands the tree structure with a node representing the element, wherein the tree structure is expanded bottom-up;

generate a set of new actions based on the node associated with the selected action and the vocabulary, wherein each action in the set of new actions is a tuple representing a symbol drawn from the vocabulary, an ordered list of arguments, wherein each of the arguments is a node in the tree structure, and a probability that the symbol should be part of a returned output;

add the set of new actions to the queue of actions;

repeat selecting, processing, generating and adding until a criterion is met; and output a logical form of the natural language expression, the logical form being a machine interpretable meaning representation of the input data, wherein the logical form is provided as an s-expression representing the tree structure, wherein symbols of the s-expression represent nodes of the tree structure.

10. The computer program product of claim 9, wherein the tree structure is a directed acyclic graph (DAG).

11. The computer program product of claim 9, wherein the action is selected based on the action meeting a threshold probability that the element is to be used in expanding the tree structure.

12. The computer program product of claim 9, wherein the action is selected that has highest probability that the element is to be used in expanding the tree structure.

13. The computer program product of claim 9, wherein the device is further caused to determine a probability that the tree structure should contain a new node representing an element of the vocabulary that has the node as an argument, in generating the set of new actions.

14. The computer program product of claim 9, wherein the device is further caused to determine a probability that the tree structure should contain a new node representing an element of the vocabulary that has a pair of nodes in the tree structure as a left argument and a right argument, in generating the set of new actions.

15. The computer program product of claim 9, wherein the action includes a generation action that makes the node a parent to an existing single node in the tree structure.

16. The computer program product of claim 9, wherein the action includes a pointer action that makes the node a parent to an existing pair of sibling nodes in the tree structure.

17. A system comprising:

at least one computer processor;

at least one memory device coupled with the at least one computer processor;

the at least one computer processor configured to at least:
receive input data associated with a natural language expression;

select an action from a queue of actions the queue of actions storing at least one action, the action being associated with an element from vocabulary of the natural language expression;

process the selected action to build a tree structure wherein the processing of the selected action expands the tree structure with a node representing the element, wherein the tree structure is expanded bottom-up;

generate a set of new actions based on the node associated with the selected action and the vocabulary, wherein each action in the set of new actions is a tuple representing a symbol drawn from the vocabulary, an ordered list of arguments, wherein each of the arguments is a node in the tree structure, and a probability that the symbol should be part of a returned output;

add the set of new actions to the queue of actions;

repeat selecting, processing, generating and adding until a criterion is met; and output a logical form of the natural language expression, the logical form being a machine interpretable meaning representation of the input data, wherein the logical form is provided as an s-expression representing the tree structure, wherein symbols of the s-expression represent nodes of the tree structure.

18. The system of claim 17, wherein the tree structure is a directed acyclic graph (DAG).

19. The system of claim 17, wherein the action is selected based on the action meeting a threshold probability that the element is to be used in expanding the tree structure.

20. The system of claim 17, wherein the action includes at least one of: a generation action that makes the node a parent to an existing single node in the tree structure; and a pointer action that makes the node a parent to an existing pair of sibling nodes in the tree structure.

* * * * *